Patented Dec. 30, 1941

2,268,388

UNITED STATES PATENT OFFICE 2,268,388

ANTIFREEZE SOLUTION

Forest James Funk, Wilmington, Del., assignor to E. I. du Pont de Nemours & Company, Wilmington, Del., a corporation of Delaware No Drawing. Application July 23, 1940, Serial No. 346,996

19 Claims. (Cl. 252—77)

This invention relates to anti-freeze solutions for heat exchange devices and the like and particularly to aqueous alcohol solutions for use in automobile radiators.

Aqueous solutions of alcohol are commonly employed as the liquids in heat exchange devices particularly in automobile radiators. One of the more important problems involved in the use of such liquids results from the fact that the alcohol is volatile and forms with water an azetropic mixture even more volatile than the alcohol or water. Because of this, there is a tendency for the alcohol to be evaporated from the solution with consequent loss of its desirable properties and functions.

Several expedients have been employed in an attempt to avoid evaporation of the alcohol in such solutions. One expedient which has been employed comprises the addition to the solution of a small amount of a high boiling liquid, such as aromatic hydrocarbons, petroleum oils, animal and vegetable fats and oils, higher alkanes, higher alkanols and the like. These high boiling liquids, when employed to retard the evaporation of the alcohol, are employed in sufficient amounts to theoretically form a layer of oily material on the upper surface of the aqueous alcohol solution. Such high boiling liquids, particularly hydrocarbon oils, tend to float on the surface of the aqueous alcohol solution in lenticular droplets or contracted flattened lenticular masses, whereby the film of oily material on the surface of the aqueous alcohol solution is discontinuous and non-uniform leaving portions of the surface of the aqueous alcohol solution exposed to the atmosphere. This effect is objectionable since the purpose of the oily material in such case is to form a continuous film on the surface of the aqueous alcohol solution to prevent evaporation of alcohol into the atmosphere. When the oil film is discontinuous, the alcohol rapidly evaporates from the surfaces of the solution which are not covered by the oily material.

It is an object of the present invention to provide new and improved liquids for use in heat exchange devices. Another object is to provide heat exchange liquids which comprise aqueous solutions of alcohol, containing separable oils and containing an agent to render the oil film more uniform and continuous. A further object is to produce aqueous alcohol anti-freeze solutions which have less tendency to lose alcohol by evaporation. A still further object is to provide a new and improved non-corrosive anti-freeze solution particularly adapted for use in automobile radiators. Other objects are to provide new compositions of matter and to advance the art. Still other objects will appear hereinafter.

The above and other objects may be accomplished in accordance with my invention which comprises incorporating in an unsubstituted volatile water-soluble alcohol, such as ethyl alcohol, an inert separable oil, sufficient in amount to form a continuous layer upon the upper surface of an aqueous solution containing the same amount of alcohol in a concentration of less than 50% by volume, and a small amount of an alkyl-C-betaine or alkyl-N-betaine in which the designated alkyl groups contain from 6 to 18 carbon atoms. I have found that such alkyl substituted betaines act upon the oil film, which is formed when the alcohol is diluted with water to 50% or less concentration, to cause the oil to spread over the surface of the aqueous alcohol solution in a uniform continuous film which is very effective to prevent evaporation of the alcohol from the solution, even at relatively high temperatures. If such film is broken, as by a mechanical disturbance, the alkyl substituted betaine operates to rapidly restore the film of oil on the surface.

By a separable oil, I mean an oily material which has a boiling point of at least 150° C. and a specific gravity such that it will float on an aqueous solution containing up to 50% of alcohol and which is immiscible with aqueous alcohol solutions containing up to 50% of alcohol. I intend to exclude the so called "soluble oils" which comprise oily materials and emulsifying agents sufficient in amount to largely emulsify the oil with aqueous alcohol solutions. Preferably, the separable oils are hydrocarbons and particularly mineral hydrocarbon oils. Petroleum distillates, such as kerosene and long-time burning oil, are particularly desirable.

The amount of the oily material, incorporated in the alcohol, should be such as to form a continuous film over the surface of an aqueous alcohol solution obtained by diluting the alcohol with water to 50% or less concentration when the surface to volume ratio does not exceed 18 sq. cm. to 100 cc. For anti-freeze solutions to be used in automobile radiators, from about 3 to about 4 volumes of oily material will be used for about 100 volumes of alcohol. The proportion of separable oil to alcohol may be widely varied, depending primarily on the surface to volume ratio of the diluted solution.

Betaine, in the form of its inner anhydride, has the formula

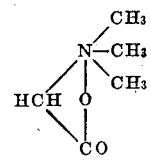

The alkyl-C-betaines and alkyl-N-betaines of my invention, in the form of their inner anhydrides, may be represented by the formula

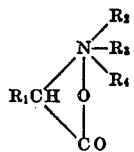

in which one of $R_1$, $R_2$, $R_3$ and $R_4$ is an alkyl group of 6 to 18 carbon atoms, and preferably 10 to 18 carbon atoms. When $R_1$ represents an alkyl radical of 6 to 18 carbon atoms, $R_2$, $R_3$ and $R_4$ represent aliphatic radicals containing less than 8 carbon atoms. When one of $R_2$, $R_3$ or $R_4$ represents an alkyl radical of 6 to 18 carbon atoms, $R_1$ represents hydrogen or an aliphatic radical of less than 8 carbon atoms and the rest of $R_2$, $R_3$ and $R_4$ represent aliphatic radicals of less than 8 carbon atoms. When I refer to an "alkyl-C-betaine," in which the alkyl group contains 6 or more carbon atoms, I mean that $R_1$ in the above formula is the alkyl group which contains the 6 or more carbon atoms. When I refer to "alkyl-N-betaines," in which the alkyl group contains 6 or more carbon atoms, I mean that one of $R_2$, $R_3$ and $R_4$ represents the alkyl group of 6 or more carbon atoms. The alkyl substituted betaines of my invention and methods of preparing them are disclosed in Patent 2,129,264 to F. B. Downing and F. William Johnson, particularly in lines 25 to 75, column 2 of page 3, page 4 and lines 1 to 67 of column 1 of page 5 of this patent. It will be noted that the N in the betaine may form part of a heterocyclic group such as pyridine, piperidine, alkyl piperidine, alkylol piperidine and the like, wherein two of $R_2$, $R_3$ and $R_4$ represent a chain in which the terminal carbon atoms are attached to the nitrogen. The compounds of such class so defined are generally effective for my purpose. This was particularly surprising since betaine itself is substantially ineffective for my purpose.

The following compounds have been found to be particularly effective for my purpose.

*Hexadecyl-C-betaine*

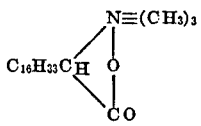

*Octadecyl-N-betaine*

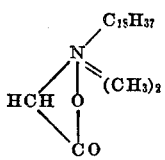

*Isopropanol-N-pentadecyl-C-betaine*

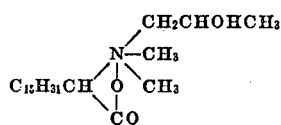

*Isopropanol-N-hexadecyl-C-betaine*

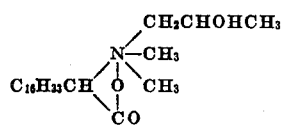

The hexadecyl-C-betaine is the preferred embodiment of my invention and may be prepared from trimethyl amine and alpha-bromo-stearic acid in accordance with Example 1 of Patent 2,129,264 above referred to. Another useful compound of my invention may be obtained from technical alpha-bromo-lauric acid derived from cocoanut oil acids, in place of the alpha-bromo-stearic acid employed in Example 1 of Patent 2,129,264. This latter product is a mixture in which the alkyl substituent represented by $R_1$ has an average chain length of 11. In the octadecyl-N-betaine, $R_1$ represents hydrogen, $R_2$ represents the octadecyl group and $R_3$ and $R_4$ represent methyl groups. This last compound may be prepared in accordance with the process in Example 4 of Patent 2,129,264.

The amount of alkyl substituted betaines of my invention which may be employed may be widely varied. However, care should be taken not to employ sufficient amount to emulsify any substantial proportion of the separable oil as such emulsification may cause incomplete film formation and lead to disadvantageous effects in the heat exchange device. The amounts will vary with different compounds but will generally fall within the range of from about 0.0003 to about 0.03% by weight based on the alcohol. I have found that the addition of from 1 to 2 parts by volume of a 25% aqueous solution of the alkyl substituted betaine to 7000 parts of the alcohol to be satisfactory in most cases.

Heat exchange liquids, particularly those for automobile radiators, may vary in pH from about 5.5 to about 8.0. The alkyl substituted betaines of my invention are effective throughout such range. I generally prefer my compositions to be slightly on the acid side of neutrality and preferably employ caustic soda to produce desired pH. Any other common basic neutralizing agent can be employed as desired to produce this result.

It will generally be desired to employ a corrosion inhibitor in my compositions. Many suitable corrosion inhibitors are known. I preferably employ the corrosion inhibitors described in Patent 2,054,282 to R. G. Clarkson and C. J. Pedersen, and particularly the combination of an alkali metal nitrite, such as sodium nitrite, and a mercapto benzothiazole, such as mercapto benzothiazole itself. The corrosion inhibitor will be employed in the proportions disclosed in Patent 2,054,282, that is from 0.05 to about 5.0% of the alkali metal nitrite and from about 0.005 to about 0.1% of the mercapto benzothiazole.

The compositions of my invention will also preferably contain from about 0.05 to about 1.0% of a water soluble acid containing a hydroxy aliphatic group of not more than 6 carbon atoms in a straight chain or a water soluble salt thereof, and particularly an alkali metal salt of lactic acid, such as sodium lactate. Such acids and their salts are described in lines 28 to 50, column 2, page 2 of Patent 2,087,103 to F. B. Downing and C. J. Pedersen. I have found that such acids and their salts are effective to maintain rust particles in a finely divided state and prevent the agglomeration of the rust particles and their adherence to metal surfaces and the like, even in the absence of the higher alkanols employed by Downing and Pedersen and in the presence of the alkyl substituted betaines of my invention.

In order to test the effectiveness of my compounds and of other basic materials, the separable oil and other ingredients were added to the concentrated alcohol of 188 to 190 proof which was then diluted with distilled water to the desired concentration to contain from 20 to 50% alcohol. 100 cc. of the diluted solution was placed in a 100 cc. tall form beaker and the beaker then immersed in a water bath at 160° F. so that the level of the water in the bath at the start of the test was the same as that of the test sample in the beaker. Five minutes were allowed for the contents of the beaker to warm up to the temperature of the bath, and then the sample was allowed to stand undisturbed for one hour in the beaker in the bath. At the end of one hour, the volume of the test sample was measured and the loss in volume recorded as loss on evaporation. This is an accelerated test from the standpoint of the use of an anti-freeze in automotive vehicles and is one which has been found to give readable and duplicable results. When the dilution is such that the concentration of alcohol amounts to 35% by volume, which is the concentration approximately required to secure protection against freezing at 0° F., solutions containing no oil film will show a loss on evaporation of approximately 25 cc. under this test. Solutions, having an oil film which is incomplete at the start or which breaks during the period of the test, will show losses on evaporation of between 5.0 and 25.0 cc., depending largely upon the proportion of the exposed surface of the solution unprotected by an oil film. A solution which has a satisfactory continuous oil film over the surface will show a loss on evaporation of from about 2.5 to 4.0 cc. and at the end of the test will show a continuous oil film over the surface of the solution. While solutions diluted to contain about 35% of alcohol will generally be used as the standard in this test, satisfactory tests may be made at alcohol concentrations of from 10 to 50%. The percentage loss on evaporation, obtained in this test, will vary inversely with the covering and protecting power of the oil film on the surface of the liquid.

Employing the above method of test, a number of nitrogenous products were incorporated in comparable proportions in a base solution of the following constitution:

| | |
|---|---|
| Completely denatured alcohol (antirust CD-12) | 100 volumes. |
| Long-time burning oil | 3.3 volumes. |
| Sodium lactate 100 percent (as 50 percent solution) | 0.15 percent by weight. |
| Sodium nitrite (included in the original antirust CD-12) | 0.25 percent by weight. |
| Mercapto benzothiazole (included in the original antirust CD-12) | 0.025 percent by weight. |
| 30 percent NaOH solution | 0.025 percent by volume. |

This solution showed a pH of 6.9 (colorimetric) in 40% solution.

The results of such series of tests are given in Table I below:

TABLE I

*Loss on evaporation per cent of original volume*

| No. | Addition | Strength of test solution | |
|---|---|---|---|
| | | 20% | 40% |
| 1 | None-control | 5.00 | 17.40 |
| 2 | Hexadecyl-C-betaine | 3.87 | 13.12 |
| 3 | Tri-amylamine | 4.67 | 16.50 |
| 4 | Di-amylamine | 4.25 | 16.50 |
| 5 | Mono-amylamine | 3.87 | 16.87 |
| 6 | Cyclohexylamine | 6.25 | 18.00 |
| 7 | Pyridine | 5.65 | 17.75 |

To the same base solution, as was used in the above tests, hexadecyl-C-betaine was added to separable portions in different concentrations. Thereafter each solution was diluted with water to produce a solution containing the alcohol in a concentration of about 35%, that is, 35 cc. of the treated base solution was diluted with 65 cc. of distilled water. These solutions were then subjected to the above described tests by holding them for one hour in a water bath maintained at 160° F. The results of such tests are given in Table II.

TABLE II

| | Per cent hexadecyl-C-betaine in base solution | Per cent loss from dilution after 1 hr. @ 160° F. |
|---|---|---|
| 1 | 0.015 | 7.0 |
| 2 | 0.012 | 7.0 |
| 3 | 0.009 | 7.0 |
| 4 | 0.006 | 7.0 |
| 5 | 0.003 | 6.0 |
| 6 | 0.0015 | 9.0 |
| 7 | Zero | 19.0 |

Patent 2,087,103 to Downing et al, discloses an anti-freeze which has proved to be highly successful commercially. However, under some specific conditions, it has been found that such products do not produce oil films which are as complete as desired. I have found that the addition of the alkyl substituted betains of my invention to such anti-freeze substantially improves the continuity of the oil film produced. For example, hexadecyl-C-betaine was added, in the concentrations indicated, to a composition of the following constitution:

| | |
|---|---|
| Completely denatured alcohol (CD-12) | 100 parts by volume. |
| Long-time burning oil | 2.7 parts by volume. |
| Terpene hydrocarbons | 0.3 part by volume. |
| Terpene alcohols | 0.3 part by volume. |
| Sodium lactate (as 100%) | 0.15 part by weight of CD alcohol. |
| Sodium nitrite | 0.25 part by weight of CD alcohol. |
| Mercapto benzothiazole | 0.025 part by weight of CD alcohol. |
| Du Pont Anthraquinone Rubine-R, ca | 0.001 part by weight of CD alcohol. |

The resulting compositions were diluted to 50% concentration with distilled water and subjected to the test, hereinbefore described, for one hour in a water bath at 160° F. The results are given in the following Table III:

TABLE III

| | Percent hexadecyl-C-betaine in anti-freeze | Percent loss from 50% solution after one hour |
|---|---|---|
| 1 | Zero | 9.0 |
| 2 | 0.0168 | 6.0 |
| 3 | 0.0336 | 6.0 |

It will be understood that the various compositions, herein specifically disclosed, have been given for illustrative purposes only and that many variations may be made therein without departing from the spirit or scope of my invention. Many variations and modifications will be apparent to those skilled in the art and I intend to cover my invention broadly as in the appended claims.

One illustrative specific formula which I have found to be particularly valuable commercially is as follows:

| | | |
|---|---|---|
| Denatured alcohol | 100 | volumes. |
| Mercapto-benzothiazole | 0.025 percent | by weight. |
| Sodium nitrite | 0.25 percent | by weight. |
| Long-time burning oil | 4 | volumes. |
| Hexadecyl-C-betaine | 0.00858 percent | by weight. |
| Sodium lactate | 0.15 percent | by weight of denatured alcohol. |
| Du Pont Anthraquinone Rubine-R | 0.001 | part by weight. |

Large amounts of such compositions have been used successfully.

I claim:

1. A liquid suitable for use in heat exchange devices and the like comprising ethyl alcohol having incorporated therein an inert separable oil sufficient in amount to form a continuous layer on an extended upper surface of said liquid when in the form of an aqueous solution containing less than 50% by volume of ethyl alcohol and from about 0.0003% to about 0.03% by weight of a member of the group consisting of alkyl-C-betaines and alkyl-N-betaines in which the alkyl groups contain from 6 to 18 carbon atoms.

2. A liquid suitable for use in heat exchange devices and the like comprising ethyl alcohol having incorporated therein an inert separable oil sufficient in amount to form a continuous layer on an extended upper surface of said liquid when in the form of an aqueous solution containing less than 50% by volume of ethyl alcohol and from about 0.0003% to about 0.03% by weight of an alkyl-C-betaine in which the alkyl group contains from 6 to 18 carbon atoms.

3. A liquid suitable for use in heat exchange devices and the like comprising ethyl alcohol having incorporated therein an inert separable oil sufficient in amount to form a continuous layer on an extended upper surface of said liquid when in the form of an aqueous solution containing less than 50% by volume of ethyl alcohol and from about 0.0003% to about 0.03% by weight of an alkyl-C-betaine in which the alkyl group contains from 10 to 18 carbon atoms.

4. A liquid suitable for use in heat exchange devices and the like comprising ethyl alcohol having incorporated therein an inert separable oil sufficient in amount to form a continuous layer on an extended upper surface of said liquid when in the form of an aqueous solution containing less than 50% by volume of ethyl alcohol and from about 0.0003% to about 0.03% by weight of an alkyl-C-betaine in which the alkyl group contains 16 carbon atoms.

5. A liquid suitable for use in heat exchange devices and the like comprising ethyl alcohol having incorporated therein an inert separable oil sufficient in amount to form a continuous layer on an extended upper surface of said liquid when in the form of an aqueous solution containing less than 50% by volume of ethyl alcohol and from about 0.0003% to about 0.03% by weight of hexadecyl-C-betaine.

6. A liquid suitable for use in heat exchange devices and the like comprising ethyl alcohol having incorporated therein an inert separable oil sufficient in amount to form a continuous layer on an extended upper surface of said liquid when in the form of an aqueous solution containing less than 50% by volume of ethyl alcohol and from about 0.0003% to about 0.03% by weight of an alkyl-N-betaine in which the alkyl group contains from 6 to 18 carbon atoms.

7. A liquid suitable for use in heat exchange devices and the like comprising ethyl alcohol having incorporated therein an inert separable oil sufficient in amount to form a continuous layer on an extended upper surface of said liquid when in the form of an aqueous solution containing less than 50% by volume of ethyl alcohol and from about 0.0003% to about 0.03% by weight of an alkyl-N-betaine in which the alkyl group contains from 10 to 18 carbon atoms.

8. A liquid suitable for use in heat exchange devices and the like comprising ethyl alcohol having incorporated therein an inert separable oil sufficient in amount to form a continuous layer on an extended upper surface of said liquid when in the form of an aqueous solution containing less than 50% by volume of ethyl alcohol and from about 0.0003% to about 0.03% by weight of an alkyl-N-betaine in which the alkyl group contains 18 carbon atoms.

9. A liquid suitable for use in heat exchange devices and the like comprising ethyl alcohol having incorporated therein an inert separable oil sufficient in amount to form a continuous layer on an extended upper surface of said liquid when in the form of an aqueous solution containing less than 50% by volume of ethyl alcohol and from about 0.0003% to about 0.03% by weight of octadecyl-N-betaine.

10. A non-corrosive liquid, suitable for use in heat exchange devices and the like containing iron and copper-containing metals, comprising ethyl alcohol, a corrosion inhibitor, an inert separable oil sufficient in amount to form a continuous layer on an extended upper surface of said liquid when in the form of an aqueous solution containing less than 50% by volume of ethyl alcohol and from about 0.0003% to about 0.03% by weight of a member of the group consisting of alkyl-C-betaines and alkyl-N-betaines in which the alkyl groups contain from 6 to 18 carbon atoms.

11. A non-corrosive liquid, suitable for use in heat exchange devices and the like containing iron and copper-containing metals, comprising ethyl alcohol, 0.05 to about 5.0% of an alkali metal nitrite, about 0.005 to about 0.1% of a mercapto benzothiazole, an inert separable oil sufficient in amount to form a continuous layer on an extended upper surface of said liquid when in the form of an aqueous solution containing less than 50% by volume of ethyl alcohol and from about 0.0003% to about 0.03% by weight of a member of the group consisting of alkyl-C-betaines and alkyl-N-betaines in which the alkyl groups contain from 6 to 18 carbon atoms.

12. A liquid, suitable for use in heat exchange devices and the like containing iron and copper-containing metals, comprising ethyl alcohol, about 0.05 to about 1% of a water-soluble salt of an aliphatic hydroxy-carboxylic acid containing not more than 6 carbon atoms in a straight chain, an inert separable oil sufficient in amount to form a continuous layer on an extended upper surface of said liquid when in the form of an aqueous solution containing less than 50% by volume of ethyl alcohol and from about 0.0003% to about 0.03% by weight of a member of the group consisting of alkyl-C-betaines and alkyl-N-betaines in which the alkyl groups contain from 6 to 18 carbon atoms.

13. A liquid, suitable for use in heat exchange devices and the like containing iron and copper-containing metals, comprising ethyl alcohol, about 0.05 to about 1.0% of an alkali metal salt of lactic acid, an inert separable oil sufficient in amount to form a continuous layer on an extended upper surface of said liquid when in the form of an aqueous solution containing less than 50% by volume of ethyl alcohol and from about 0.0003% to about 0.03% by weight of a member of the group consisting of alkyl-C-betaines and alkyl-N-betaines in which the alkyl groups contain from 6 to 18 carbon atoms.

14. A non-corrosive liquid, suitable for use in heat exchange devices and the like containing iron and copper-containing metals, comprising ethyl alcohol, a corrosion inhibitor, about 0.05 to about 1.0% of a water soluble salt of an aliphatic hydroxy-carboxylic acid containing not more than 6 carbon atoms in a straight chain, an inert separable oil sufficient in amount to form a continuous layer on an extended upper surface of said liquid when in the form of an aqueous solution containing less than 50% by volume of ethyl alcohol and from about 0.0003% to about 0.03% by weight of a member of the group consisting of alkyl-C-betaines and alkyl-N-betaines in which the alkyl groups contain from 6 to 18 carbon atoms.

15. A non-corrosive liquid, suitable for use in heat exchange devices and the like containing iron and copper-containing metals, comprising ethyl alcohol, 0.05 to about 5.0% of an alkali metal nitrite, about 0.005 to about 0.1% of a mercapto benzothiazole, about 0.05 to about 1.0% of an alkali metal salt of lactic acid, an inert separable oil sufficient in amount to form a continuous layer on an extended upper surface of said liquid when in the form of an aqueous solution containing less than 50% by volume of ethyl alcohol and from about 0.0003% to about 0.03% by weight of a member of the group consisting of alkyl-C-betaines and alkyl-N-betaines in which the alkyl groups contain from 6 to 18 carbon atoms.

16. A non-corrosive liquid, suitable for use in heat exchange devices and the like containing iron and copper-containing metals, comprising ethyl alcohol, 0.05 to about 5.0% of an alkali metal nitrite, about 0.005 to about 0.1% of a mercapto benzothiazole, about 0.05 to about 1.0% of an alkali metal salt of lactic acid, an inert separable oil sufficient in amount to form a continuous layer on an extended upper surface of said liquid when in the form of an aqueous solution containing less than 50% by volume of ethyl alcohol and from about 0.0003% to about 0.03% by weight of an alkyl-C-betaine in which the alkyl group contains from 6 to 18 carbon atoms.

17. A non-corrosive liquid, suitable for use in heat exchange devices and the like containing iron and copper-containing metals, comprising ethyl alcohol, 0.05 to about 5.0% of an alkali metal nitrite, about 0.005 to about 0.1% of a mercapto benzothiazole, about 0.05 to about 1.0% of an alkali metal salt of lactic acid, an inert separable oil sufficient in amount to form a continuous layer on an extended upper surface of said liquid when in the form of an aqueous solution containing less than 50% by volume of ethyl alcohol and from about 0.0003% to about 0.03% by weight of hexadecyl-C-betaine.

18. A non-corrosive liquid, suitable for use in heat exchange devices, and the like containing iron and copper-containing metals, comprising ethyl alcohol, 0.05 to about 5.0% of an alkali metal nitrite, about 0.005 to about 0.1% of a mercapto benzothiazole, about 0.05 to about 1.0% of an alkali metal salt of lactic acid, an inert separable oil sufficient in amount to form a continuous layer on an etxended upper surface of said liquid when in the form of an aqueous solution containing less than 50% by volume of ethyl alcohol and from about 0.0003% to about 0.03% by weight of an alkyl-N-betaine in which the alkyl group contains from 6 to 18 carbon atoms.

19. A non-corrosive liquid, suitable for use in heat exchange devices and the like containing iron and copper-containing metals, comprising ethyl alcohol, 0.05 to about 5.0% of an alkali metal nitrite, about 0.005 to about 0.1% of a mercapto benzothiazole, about 0.05 to about 1.0% of an alkali metal salt of lactic acid, an inert separable oil sufficient in amount to form a continuous layer on an extended upper surface of said liquid when in the form of an aqueous solution containing less than 50% by volume of ethyl alcohol and from about 0.0003% to about 0.03% by weight of octadecyl-N-betaine.

FOREST JAMES FUNK.